Oct. 25, 1949.  G. T. MACBETH  2,485,835
WASH BOX AND TAR SEPARATOR OF WATER
GAS MANUFACTURING MACHINES
Filed Aug. 14, 1946  3 Sheets-Sheet 1

GEORGE TRENHOLM MACBETH
INVENTOR.

BY: *Julian J. Watts*,

HIS ATTORNEY.

Patented Oct. 25, 1949

2,485,835

UNITED STATES PATENT OFFICE 2,485,835

WASH BOX AND TAR SEPARATOR OF WATER-GAS MANUFACTURING MACHINES

George T. Macbeth, Bronxville, N. Y.

Application August 14, 1946, Serial No. 690,554

2 Claims. (Cl. 261—121)

This invention relates to water gas machine wash boxes and tar separators, and has for its main object to provide, in combination with, and attached to the gas machine, a device of this character which will be adapted in one unit to wash and cool the gas, and to remove impurities, as the light carbon, or so-called "lamp black," and particularly the tar, from the gas, in a novel, improved, and more efficient manner than is done by the various separate devices used at present for such purpose.

At present there is a wash box for cooling and washing the gas, and then a separate equipment for removing the tar from the used washing liquid, thereby entailing much larger capital investment, more complicated machinery, and much larger requirement of space than is the case with my device, and still showing very unsatisfactory results, far inferior to those attained by my novel combined wash box and tar separator.

My novel wash box and tar separator, as will be apparent from this specification, performs all the various necessary operations in one single unit, requiring much less expense, smaller space, less complicated equipment, and being adapted not only to perform the usual separation of impurities in a more efficient manner, but also additional operations, not shown by the present wash boxes and tar separators.

The principal functions of a water gas machine wash box are: to cool the gas, to wash from the gas most of the tar and some of the other impurities, as the gas bubbles through the sealing liquid, mostly water, and by means of one of its internal parts called a "dip-pipe" to automatically seal or check gas back flow, so that none of it, after it has passed the seal, may flow backwards into the manufacturing gas machine and be burned and wasted. The present wash box has no facilities for, and does not separate, tar from the sealing liquid, after the tar has been washed out of the gas passing through it.

This automatic sealing or checking of a back gas flow is necessary, as the process of water gas manufacturing is an intermittent one, consisting of a blast or heating up period, and a gas making, or running, period, for a complete cycle of operation.

The proper level of the liquid in the wash box is maintained by an overflow and circulating water being pumped into it. All the impurities that are washed out of the gas by the liquid or water of the wash box, are at present supposed to flow out of the overflow pipe to be removed from the water content in a separate equipment. The water then is returned to wash box for a renewed use as a washing and sealing material.

My novel wash box and tar separator for water gas manufacturing machines carries out all the functions performed by the present type of wash box, and, in addition, it also separates most of the tar from the sealing and washing liquid, before it is permitted to overflow. It also removes most of the light carbon, so-called "lamp black" from the water before it is mixed with it and tar. Tar, lampblack and water are hard to separate after they become mixed, or emulsified, as is the case with gas wash boxes used at present.

There are at present three general methods for the separation of the tar and other impurities from the water overflowing from wash boxes.

Two generally accepted methods for separation are based on the fact that water is lighter, in specific gravity than tar produced in a water gas machine, the third is based on the fact that water evaporates at a lower temperature than tar, so the water may be evaporated from the mixture by heat, usually applied by means of steam coils on account of safety, as water gas tar is highly inflammable.

One of the gravity methods is to flow the liquid, tar and water mixture, after it has come from the wash box, into large settling tanks, and allow sufficient time for tar to settle to the bottom of the tank, the water being on the top. This method is slow, requires large area and equipment, and for these reasons is expensive and not popular.

The other gravity method is to allow the liquid tar and water mixture from the wash box to flow slowly through long tanks equipped with baffles, across the liquid flow, so when the mixture flows against these baffles, the tar being heavier, some of it will settle to the bottom of the tank. The liquid will be caused to flow on through a series of such baffles until most of its tar content has been removed. The water is then returned to the wash box for more gas cooling, washing, and sealing off of the gas in the wash box.

My novel wash box and tar separator also employs gravity to separate the tar, but it has an entirely novel design and operation of the parts, resulting in the many improvements, over the methods now in use, indicated hereinbefore.

One embodiment of my novel water gas wash box and tar separator is indicated in the enclosed drawings, in which.

Figure 5:
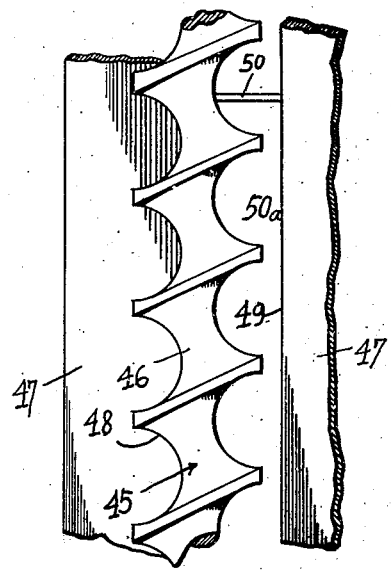
Fig. 5 is a semi-diagrammatical fragmentary enlarged view, showing a novel, auger principle, baffle, to be used in said water section of my invention.
Figure 1:
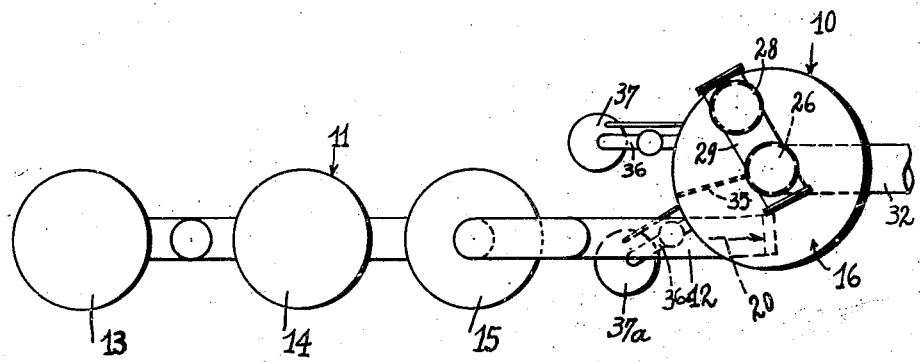
Fig. 1 is a diagram of a usual water gas manufacturing machine to which my novel combined wash box and tar separator has been substituted for the wash box used at present.

Referring now to the drawings more in detail, by characters of reference, the numeral 10 indicates my novel combination wash box and tar separator, in general, and it may be attached to a usual water gas manufacturing equipment or machine, generally indicated by the numeral 11, as through a gas inlet pipe 12.

As is well known in this art, said water gas manufacturing equipment may comprise a generator 13, a carburetter 14, and a super-heater 15.

My combination wash box and separator 10 may have the circular tank formation 16 indicated in the drawings, having an outer vertical cylindrical shell, 16a.

Tank 16 will be filled with the washing liquid 17, usually water, to a predetermined level, as indicatetd at 18. The hot gas arrives from the manufacturing machine through the pipe 12, which dips into the washing liquid 17 to a desired extent, as indicated at 19, whereby the sealing of the gas is effected and a return of it into the manufacturing machine prevented.

I arrange the incoming, or so-called "dip-pipe," in a double inclined manner with reference to the axis of the tank 16, as indicated in the drawings, by which I mean that said pipe will be inclined downwardly and also tangentially, so that the hot gas arriving under the usual pressure, will have a tendency to travel downwardly in the tank and, at the same time, circularly, around the same. The direction of the circular motion I choose to be anti-clockwise, as also indicated in the drawings, as such motion will be less influenced by the rotation of the earth than would be the case with a circular motion in a clockwise direction. The direction of the incoming gas is indicated by the arrow 20.

The incoming gas will cause the washing and sealing liquid 17 to move downwardly and circularly, as indicated by the arrow 21, and this combined motion of the washing liquid will be a great factor of the tar separation in my novel device. The gas will emerge from the washing liquid, as indicated by the arrow 22, and will be collected in the gas compartment, 23, being the upper portion of the tank 16, above the washing and sealing liquid. In said compartment, appropriate baffles 24 may be secured around the circumference of the tank 16 to its shell 16a, and other baffles 25 around the center gas outlet pipe 26 (to be described presently), while still further baffles 27 may be employed between said two systems of baffles in a staggered manner.

The gas, still retaining some of its rotary impulse, and, rising upwardly in the space 23, will be engaged by the various baffles and any impurities, or tar, which may still be in the same, after having bubbled out from the wash liquid, will be dropped downwardly into said liquid, through the action of said baffles.

The cleaned and washed gas will exit from the gas compartment 23, as by the pipe 28, and will be turned back downwardly through the pipe 29 into said central gas outlet pipe 26, as indicated by the arrow 30, the gas then descending through said central pipe to the bottom 31 of the tank and therethrough into a tar free gas removing pipe 32.

A similar system of baffles will be arranged in the washing liquid 17 around the tank wall 16a, and on the central gas outlet pipe 26, respectively, as has been described for the gas compartment 23, and as generally indicated by the numerals 24a and 25a. As will be noted in Fig. 2, some of these baffles however will be downwardly widening, and the outer baffles 24a also may be set inclined to the vertical axis of the device.

The washing water 17, set into a circular and downward motion by the action of the incoming gas, will strike these baffles and will deposit its tar content thereon, said deposited tar then dropping downwardly or flowing on said baffles, to the bottom of tank 16.

A perforated partition or baffle 33 is arranged across the tank 16, at a desired distance above the bottom 31 thereof, and the tar will accumulate between the bottom 31 and said partition wall 33, said tar compartment being indicated by the numeral 34.

A radially set vertical skimming baffle 35 will be arranged at the level 18, across the sealing and washing liquid 17, from the outgoing central pipe 26 to the outer shell wall 16a of the tank 16, and an overflow 36 is provided in the wall of the tank at that place.

The lower edge 35a of the skimming baffle 35 will be set at a predetermined distance below the level 18 of the liquid, while its upper edge 35b will be a short distance thereabove, and the purpose of this radial skimming baffle 35 is to skim and remove the light impurities floating on the top of the liquid 17 and being in circular motion therewith. The skimmed light impurities, particularly carbon, or lamp black, will be removed through the overflow 36 passing through a seal pot, generally indicated by the numeral 37, and of any usual, well known, construction.

A filling device, generally indicated by the numeral 38, and also of any design well known to those versed in this art, is arranged on the top of the tank 16 for the sealing and washing liquid.

A second sealing pot 37a also is provided at an appropriate place on the tank 16 for the overflow of the sealing and washing water, said pot being of the same construction as the seal pot 37 for the lamp black and other floating material, but being set to the rear of it with reference to said circular motion of the washing liquid.

The bottom of the overflow 36 in both sealing pots, 37 and 37a, is level with the normal water level 18 in my device. Upon the incoming gas setting the liquid into a circular motion, its outer margins will be somewhat raised and the light impurities, flowing on top of the liquid will be removed through sealing pot 37. When the water level 18 is generally raised higher, then the second overflow, into pot 37a, will remove the excess water. It is to be understood that the overflow into pot 37, for the light impurities, will be substantially restricted in relation to the opening for the overflow into pot 37a. At a normal, quiet level 18 neither overflow will operate.

I also employ a power pump, generally, and diagrammatically, indicated by the numeral 39, and of any appropriate construction, which may draw the sealing and washing liquid from its lower level, adjacent to the perforated partition 33, as indicated by the pipe line 40, and return the water through a specifically constructed head or spout 41, near the upper level of the sealing and washing liquid, as by the pipe line 42.

The delivery head 41 of the water will have such a construction as to discharge the water similarly to the discharge of the incoming gas, that is, inclined downwardly and tangentially. It will be seen that, by this means, the water will be kept in descending circulation. The lower portion thereof, also, will be elevated and returned at the top portion, whereby the top portion will have a tendency to descend, and the water, through this action, and through the action of the delivery or discharge head 41, will be kept in a downward, sinking and circularly rotating motion. The discharge head 41 will be arranged in such a manner as to cause the water to circulate in an anticlockwise direction, as will be understood, whereby the action of the incoming gas and of the circulating water will be added to better insure a downward and circulatory motion in the liquid.

This arrangement of circulating the water, however, is needed not only to add to and increase the downward and circulatory motion of the same, caused by the incoming gas, but it is mainly needed because the manufacturing of water gas is a process of an intermittent nature, and there are periods when no gas will be discharged from the pipe 12, and then the water in my wash box and tar separator would stop its circular and downward motion, but for the action of the circulating system of the power pump 39 and its associated elements.

Figure 2:
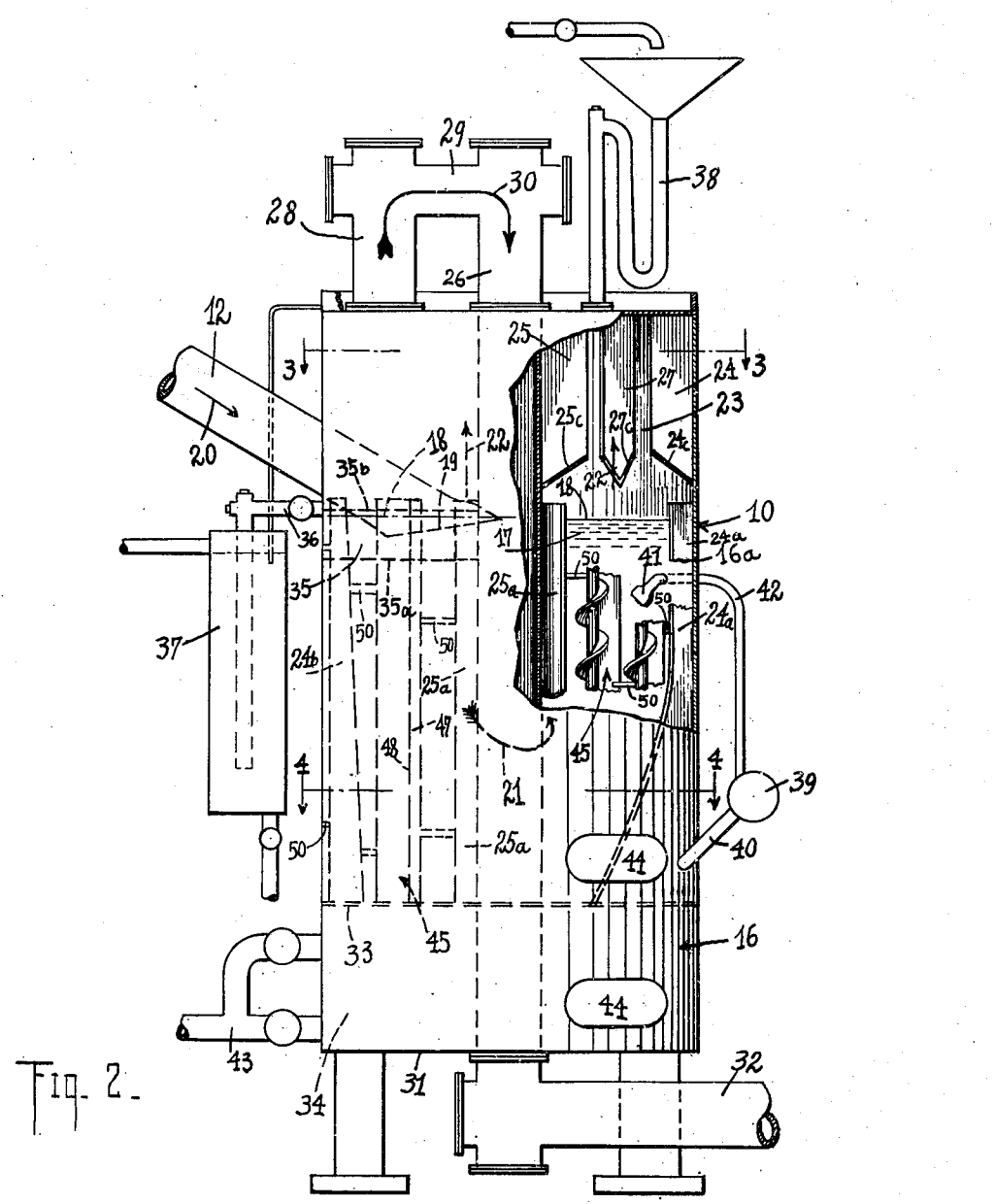
Fig. 2 shows, in a diagrammatical manner, and in an elevational view, partly in section, my novel combined wash box and tar separator.
Figure 3:
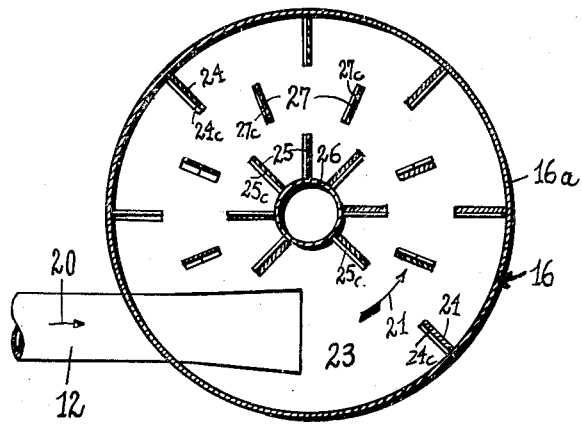
Fig. 3 is a diagrammatical horizontal sectional view of the same, the section being taken on the line 3—3 of Fig. 2, through the gas compartment of my device.

Head 41 in its simplest form may be a flattened terminating pipe forming a slot shaped inclined spout, as indicated in Fig. 2.

As has been mentioned, when the lamp black is permitted to mix with the water and the tar in it, as is the case with the present methods of washing the gas and separating the tar therefrom, the lamp black and the tar particles will unite, and the combination will be a mixture which is of the same specific gravity as the water, or usually even lighter than the water. When such a mixing is permitted to take place, then it will be very hard, and, to a large extent impossible, to remove the tar from the water, since it will not sink to the bottom thereof, but will float in it, and it also will be very difficult to separate the lamp black from it.

In my method, the lamp black is separated before it will have any chance of mixing with the liquid and with the tar therein. Not only will the valuable lamp black be saved by my method, but the tar will sink to the bottom of the device into the tar compartment 34, through the mentioned action of the movement in the washing liquid and of the baffles arranged therein. The hot gas, passing through the central exit pipe 26, will heat the washing liquid, and this will facilitate the removal of the tar, as it is well known in this art.

The inner baffles 25 secured on the pipe 26 also will act as fins, and facilitate the heating action of the tube 26 at the center, and thereby also aiding in the cooling of the gas.

The gas, therefore, will leave my device in a much cooler state than is the case with present washing devices, and its heat will be employed in a useful manner to aid in the removal of the tar.

The tar also will be dehydrated and dried through the action of the gas passing through the center of its compartment 34, and it may be removed when desired, as indicated at 43.

At 44 I indicate manholes which may be employed at any suitable and necessary places, as will be understood, and my combined gas wash box and tar separator is also adapted to have its parts easily accessible, and of curved continuous lines, and easily cleaned by methods used in such cases at present.

Figure 4:
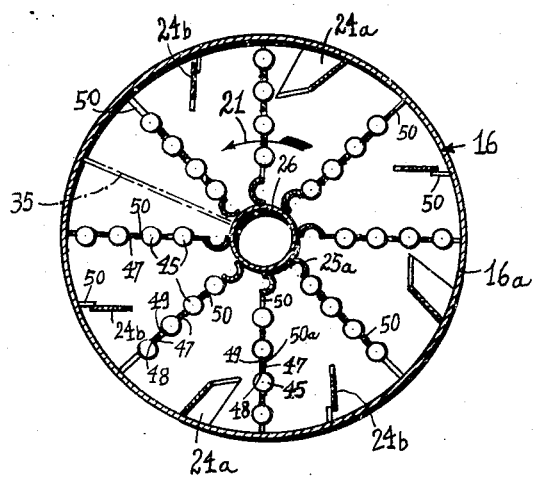
Fig. 4 is a similar cross sectional view on the line 4—4 of Fig. 2, in the liquid compartment.

In Figs. 4 and 5 I also indicate further details of my device. It will be seen that the outer baffles 24a, secured on the shell 16a of the tank 16, will be inclined in the direction of the circulating movement of the water, and additional similar baffles 24b will be arranged, separated from said shell, whereby the circulating water in such places may pass between the baffles 24b and the shell 16a, being caused not only to impact on the baffle 24b, but to slide transversely thereon, all of which will aid in the deposit and removal of the tar.

It also will be seen that the inner baffles 25a will be curved, their concave sides turned against the movement of the water, whereby they form a kind of pockets which also will aid in the removal of the tar.

Finally, I also employ a plurality of intermediate novel baffle devices in the liquid section 17, said baffles being generally indicated by the numeral 45. These baffles will be somewhat like auger shaped, as indicated at 46 in Fig. 5, and will be vertically set in the tank, a desired number of them being arranged in a radius, and in the various radii the same will be staggered.

A partial vertical wall or plate 47 will be arranged between adjacent auger baffles 46, however, closing on the auger at one side only, as indicated at 48, and being spaced apart therefrom at the other side, as indicated at 49, leaving a free space 50a between each plane baffle 47 and the adjacent auger 46.

The washing liquid in its downward and circulatory motion, will slide along the auger elements in the baffles 46, and will impact against the plane baffles 47, all of which will aid in the tar being deposited and then moved downwardly, towards the bottom of the device.

It also will be seen, by observing the right hand upper part of Fig. 2, that the baffles 24, 25 and 27 in the gas compartment will have downwardly pointed lower ends bordered by transversely projecting ridges or ledges, as indicated at 24c, 25c and 27c. The purpose of this device is that the tar particles deposited by the whirling gas on these baffles will slide downwardly thereon, then to their points sliding along the said lower ledges or ridges 24c, 25c and 27c, so that, at said lower points, comparatively large drops of tar will accumulate before it will fall into the liquid 17. Without this precaution, smaller tar particles, dropping from the baffles, may be caught by the whirling gas stream, and may again be carried back into it.

As seen by the fragmentary detail of Fig. 4, the baffles 24a, secured to the shell wall in the liquid compartment, not only will gradually widen towards their bottom, but they also will be placed in an inclined manner, turned in the direction of the whirling motion of the liquid. My experience has been that such widening will cause a slowing down in the whirling of the liquid towards the bottom of the tank, which will aid in the depositing and sliding of the tar on these baffles into the tar compartment.

The baffles 24b in the liquid compartment, which are alongside of the shell wall, but separated from it, may have similar constructions to baffles 24a, or may be simply vertically set and possibly widening towards their bottoms.

I also want to remark that, at the left hand side of Fig. 2, I show by dotted lines, in a diagrammatical manner, three forms of baffles used in the liquid compartment, the outermost, 24b, being the one adjacent to the shell wall, the middle one 45 being the auger shaped with its wall 47, and the innermost 25a being the one secured on the central gas pipe 26. It is to be noted that this indication not only is diagrammatical, but also somewhat out of proportion, and only one auger shaped baffle 45 is shown, while in actual practice, several such baffles will be arranged in a radius, as indicated in Fig. 4.

This exaggerated, out of proportion arrangement is indicated in Fig. 2, for the sake of clearness, and to give a better idea of the arrangement of said three baffles. Securing means, like small rods 50, may also be employed between the various baffles and the shell wall, respectively, whereby a well-secured, rigid construction may be attained.

The perforated partition 33 above the tar compartment will also prevent the agitation of the tar by the liquid thereabove.

A small, appropriate tool may be attached to the lower edge or mouth 19 of the gas inlet pipe, said apparatus being operable from the outside, and adapted to clean said mouth or opening, as will be understood. Similarly, my device is adapted to be built, so to say, stream-lined, avoiding pockets and inaccessible corners, as is the case with wash boxes used at present for water gas manufacturing plants, and the corners of my device may also be provided with nozzles controlled from the outside, through which said corners may be cleaned by so-called "drip oil" under pressure, as also is well known in this art, and as, for certain reasons, steam or other mediums would be not desirable for this purpose.

It will be seen that my invention, as described hereinbefore, and shown in the drawings, will attain all the objects indicated in this specification, and the beneficial results, highly superior to those attained by the gas washing and cleaning devices used at present. My invention will assure that light impurities and carbon black will be separated from the whirling liquid before it will have a chance to mix and combine with the tar therein, as has been mentioned hereinbefore, and also, the parts, movements, and operations in my invention are made to induce all content of the sealing liquid, heavier than water, to converge and drop in the liquid, and accumulate and be dropped in the lower tar compartment of the device.

I also may mention that the scarcity of higher grade oil for water gas manufacture, the price of which is the largest cost item for raw materials, compelled many companies to use a lower grade or heavier oil called "bunker" for the purpose of water gas manufacture.

Tar separation from the wash box sealing liquid under these circumstances with the "bunker" oils, has become very much more difficult than previously, hence there now is a great need for a device of the type and character of my invention.

While I have shown a preferred embodiment of my invention, it is to be understood that changes and variations may be resorted to in the elements, constructions and combinations of my invention, and I reserve my rights to such changes and variations as are within the spirit of this specification, and the scope of the claims hereunto appended.

What I claim as new, and want to protect by Letters Patent of the United States, is:

1. In a combination gas wash box and tar separator, a closed shell of substantial height with relation to its width, having a washing liquid in the lower part thereof and a gas receiving compartment thereover, a gas inlet pipe through the wall of the shell at said gas compartment, said inlet pipe being directed downwardly and inclined to the plane containing the point of its entry and the vertical axis of the shell, its lower end being underneath the level of said liquid, whereby the gas, leaving the same, will cause in said liquid downward and tangential whirling motions, and an exit pipe adapted to guide the gas from said gas compartment downwardly in the center of the device through said liquid, and then outwardly, generally vertical baffle plates secured on said center exit pipe, upstanding inclinedly placed baffle plates secured on the inside of the shell, and auger shaped, generally vertical, intermediate baffles between said inner and outer systems of baffles.

2. In a combination gas wash box and tar separator, a closed shell of substantial height with relation to its width having a washing liquid in the lower part thereof and a gas receiving compartment thereover, a gas inlet pipe through the wall of the shell at said gas compartment, said inlet pipe being directed downwardly and inclined to the plane containing the point of its entry and the vertical axis of the shell, its lower end being underneath the level of said liquid, whereby the gas leaving the same will cause in said liquid downward and tangential whirling motions, and means to draw the liquid from the lower part of the tank and return it thereinto near the level of the liquid, a return spout in said means adapted to direct the returned water downwardly and at an angle to any plane of the axis of the device, whereby it will cause a downward and a rotary swirling movement in the liquid.

GEORGE T. MACBETH.

REFERENCES CITED

The following references are of record in the file of this patent:

UNITED STATES PATENTS

| Number | Name | Date |
| --- | --- | --- |
| 505,977 | Fletcher | Oct. 3, 1893 |
| 691,485 | Porbeck | Jan. 21, 1902 |
| 953,960 | Koppers | Apr. 5, 1910 |
| 1,010,044 | Grace | Nov. 28, 1911 |
| 1,025,863 | Clausen | May 7, 1912 |
| 1,504,265 | Palmer | Aug. 12, 1924 |
| 1,594,324 | Payne | July 27, 1926 |
| 1,714,888 | Perkins | May 28, 1929 |
| 2,274,006 | Smith | Feb. 24, 1942 |

FOREIGN PATENTS

| Number | Country | Date |
| --- | --- | --- |
| 433,039 | Great Britain | July 29, 1935 |
| 857,105 | France | Apr. 8, 1940 |
| 433,221 | Germany | Aug. 24, 1926 |